US012731397B2

(12) United States Patent
Pabia et al.

(10) Patent No.: US 12,731,397 B2
(45) Date of Patent: Sep. 8, 2026

(54) METHOD OF GENERATING A PERIPHERAL IMAGE OF AN AIRCRAFT AND ASSOCIATED ELECTRONIC GENERATION DEVICE AND COMPUTER PROGRAM PRODUCT

(71) Applicant: THALES, Courbevoie (FR)

(72) Inventors: Guillaume Pabia, Merignac (FR); Bruno Capelle, Merignac (FR); Pierre Mariani, Merignac (FR); Nicolas Couder, Merignac (FR); Ali Karki, Merignac (FR); Siegfried Rouzes, Merignac (FR)

(73) Assignee: THALES, Courbevoie (FR)

( * ) Notice: Subject to any disclaimer, the term of this patent is extended or adjusted under 35 U.S.C. 154(b) by 507 days.

(21) Appl. No.: 18/319,431

(22) Filed: May 17, 2023

(65) Prior Publication Data

US 2023/0377328 A1 Nov. 23, 2023

(30) Foreign Application Priority Data

May 19, 2022 (FR) ...................................... 2204789

(51) Int. Cl.
*G06V 20/17* (2022.01)
*G06F 3/14* (2006.01)
(Continued)

(52) U.S. Cl.
CPC ................ *G06V 20/17* (2022.01); *G06F 3/14* (2013.01); *G06T 7/62* (2017.01); *G06T 7/70* (2017.01);
(Continued)

(58) Field of Classification Search
CPC ...... G06V 10/247; G06V 20/17; G06V 10/24; G06V 20/56; G06T 7/00; G06T 7/62;
(Continued)

(56) References Cited

U.S. PATENT DOCUMENTS

2009/0015674 A1* 1/2009 Alley ..................... H04N 7/185 348/E7.085
2009/0138138 A1* 5/2009 Ferren .................. G05D 1/0676 359/333

(Continued)

FOREIGN PATENT DOCUMENTS

CN 110884672 A * 3/2020 ............. G03B 37/00
WO 2011039666 A1 4/2011

OTHER PUBLICATIONS

Kang et al., Development of a Peripheral-Central Vision System for Small Unmanned Aircraft Tracking, Journal of Aerospace Information Systems, vol. 18, No. 9, Sep. 2021, pp. 645-658, doi.org/10.2514/1.1010909.*

(Continued)

*Primary Examiner* — Guillermo M Rivera-Martinez
(74) *Attorney, Agent, or Firm* — Soquel Group LLC

(57) ABSTRACT

A method of generating a peripheral image of an aircraft having pixels obtained from a plurality of cameras equipping the aircraft. The method is implemented by an electronic generation device. The method comprises a step of receiving a position of a peripheral point of view from which the peripheral image is to be generated. The method comprises steps of obtaining an orientation of the aircraft and of acquisition of a respective image from each camera. The method comprises a step of calculating a respective transfer function for each camera, each transfer function being intended for being applied to a pixel of the peripheral image so as to identify a possible corresponding pixel of the acquired image associated with the transfer function. The method comprises a step of generating the peripheral image from the images acquired from each camera and from each calculated transfer function.

12 Claims, 4 Drawing Sheets

(51) Int. Cl.
*G06T 7/62* (2017.01)
*G06T 7/70* (2017.01)

(52) U.S. Cl.
CPC ............... *G06T 2207/10032* (2013.01); *G06T 2207/30252* (2013.01)

(58) Field of Classification Search
CPC ... G06T 7/70; G06T 7/30; G06T 2207/10032; G06T 2207/30252; G06T 2207/30248
See application file for complete search history.

(56) References Cited

U.S. PATENT DOCUMENTS

2010/0254612 A1* 10/2010 Oldroyd .................... G06T 7/30
382/209
2012/0176497 A1* 7/2012 Shadmi .................... G08G 5/21
348/E7.085
2015/0334301 A1* 11/2015 He ........................ G06T 3/4038
348/36
2019/0248487 A1* 8/2019 Holtz ..................... G06V 20/17
2020/0098164 A1* 3/2020 Bruns ................... G06T 15/503
2020/0275076 A1* 8/2020 Hamilton ............. H04N 19/132
2020/0312170 A1* 10/2020 Sherback ................. G08G 5/54
2020/0388005 A1* 12/2020 Mueller .................... G06T 3/10
2021/0321038 A1* 10/2021 Raproeger ................ G06T 7/90
2022/0126864 A1* 4/2022 Moustafa .............. B60W 40/09
2024/0020968 A1* 1/2024 Haskin .................... G06F 16/29

OTHER PUBLICATIONS

FR 2204789, INPI Rapport de Recherche Preliminaire, Jan. 26, 2023, 2 pages.

* cited by examiner

H
36
M
100
95
$R_{REF}$

METHOD OF GENERATING A PERIPHERAL IMAGE OF AN AIRCRAFT AND ASSOCIATED ELECTRONIC GENERATION DEVICE AND COMPUTER PROGRAM PRODUCT

REFERENCE TO RELATED APPLICATION

This application is a U.S. non-provisional application claiming the benefit of French Application No. 22 04789, filed on May 19, 2022, the contents of which are incorporated herein by reference in their entirety.

TECHNICAL FIELD OF THE INVENTION

The present invention relates to a method for generating a peripheral image of an aircraft.

The invention further relates to an electronic device for generating a peripheral image of an aircraft, and a computer program product comprising software instructions which, when executed by a computer, implement such a method.

The present invention relates to the field of assistance in piloting an aircraft.

BACKGROUND OF THE INVENTION

When piloting an aircraft, the pilot's visibility is limited to the pilot's field of vision. However, the pilot's vision is not sufficient for informing the pilot about the presence of peripheral elements of the aircraft. E.g., when the pilot is on board the aircraft, the pilot cannot see, with their own eyes, elements situated behind or under the aircraft.

In the field of pilot assistance, it is known how to complete the pilot's field of vision by pilot assistance systems which take into account, at least partially, the environment wherein the aircraft is operating. For this purpose, cameras, RADAR sensors and LIDAR sensors are in particular known. Such systems are complementary and provide different information needed by the pilot.

Document WO 2011/039666 A1 discloses a method for assisting a pilot during a take-off or a landing of the aircraft. Such method comprises the acquisition of images from cameras and information from other aircraft sensors, such as RADAR or LIDAR sensors. Such information is acquired during the approach of the aircraft to the landing place thereof or during the take-off of the aircraft.

Then, from the images acquired during such approach, and of such take-off, respectively, the method comprises the construction of a 3D model of the landing zone, and of the take-off zone, respectively. As the approach, or take-off progresses, the 3D model is specified by new acquired images and new information coming from the sensors. Finally, a peripheral image from the 3D model is sent to the pilot to help the pilot to land, or to help the pilot to take-off, respectively.

However, such method requires the use of many sensors, in particular RADAR and LIDAR sensors, for determining the location of various objects in the environment of the landing zone, for the construction of the 3D model. Now, the combination of all the sensors is expensive, discriminating [against] the installation thereof on all aircraft.

Furthermore, the generation of a 3D model requires a long calculation time which requires the use of images acquired earlier than the time at which the 3D module is calculated.

There is thus a need for proposing a simpler solution for generating faster a peripheral image of the aircraft.

SUMMARY OF THE INVENTION

To this end, the subject matter of the invention is a method for generating a peripheral image of an aircraft, the peripheral image including a plurality of pixels obtained from a plurality of cameras equipping the aircraft, the method being implemented by an electronic generation device and comprising the following steps:

- reception of a position of a peripheral point of view corresponding to the point of view from which the peripheral image is to be generated,
- obtaining an orientation of the aircraft,
- acquisition of a respective image from each camera,
- calculation of a respective transfer function for each camera, each transfer function being intended to be applied to a pixel of the peripheral image, for identifying a possible corresponding pixel of the acquired image associated with the transfer function, and
- generation of the peripheral image from the images acquired from each camera and from each calculated transfer function.

With the calculation of the transfer functions associated with each camera, the method can be used for generating the peripheral image without resorting to a 3D model which would be complex to calculate, since such functions directly associate a pixel of the peripheral image to be generated, with a pixel of the corresponding acquired image. Thereby, the time required for generating the peripheral image is substantially reduced.

According to other advantageous aspects of the invention, the generation method comprises one or a plurality of the following features, taken individually or according to all technically possible combinations:

- the aircraft orientation obtained includes at least one orientation angle amongst an aircraft roll angle, an aircraft bearing angle and an aircraft elevation angle;
- each transfer function is configured for determining, when applied to a pixel of the peripheral image:
  - a position of an associated pixel in the acquired image if the pixel of the peripheral image corresponds to a pixel of the acquired image, or
  - an incorrect result otherwise;
- during the generation step, the content of each pixel of the peripheral image is determined via the application of the respective transfer function to said pixel and via the application of a rule for mixing the acquired images;
- the mixing rule is:
  - if the application of each transfer function to the pixel of the peripheral image provides the position of a pixel in a single acquired image, then the content of said pixel of the peripheral image is equal to the content of the pixel of the corresponding single acquired image;
  - if the application of each transfer function to the peripheral image pixel provides pixels for a plurality of acquired images, then the content of the pixel of the peripheral image is equal to the content of the pixel of the acquired image which is the most central in the respective acquired image thereof, and
  - otherwise, the pixel of the peripheral image is equal to a predefined color.
- the method further comprises a step of sending the peripheral image to a display device for being displayed to a pilot of the aircraft;
- the method further comprises an addition step of adding a symbol representing the aircraft in the generated peripheral image, the addition step comprising:

the determination of a size and of a position of the symbol representing the aircraft, depending on the position of the peripheral point of view;

the inclusion, in the peripheral image, of the symbol representing the aircraft;

the steps of obtaining, acquiring, calculating and generating are repeated a plurality of times, the plurality of peripheral images generated forming a video stream;

each transfer function checks:

$$u_c = \frac{a_u + b_u u_v + c_u v_v}{a' + b' u_v + c' v_v}$$

$$v_c = \frac{a_v + b_v u_v + c_v v_v}{a' + b' u_v + c' v_v}$$

where $u_c$ is the abscissa position of the pixel of the image acquired by the camera, $v_c$ is the ordinate position of the pixel of the image acquired by the camera, $u_v$ is the abscissa position of the pixel of the peripheral image, $v_v$ is the ordinate position of the pixel of the peripheral image, a', b', c', $a_u$, $b_u$, $c_u$, $a_v$, $b_v$, $c_v$ are first to ninth coefficients specific to each camera.

the calculation step comprises the determination of the first to ninth coefficients using that, for any target point appearing on the acquired image and on the peripheral image, the vector linking an origin of the coordinate frame associated with the camera and the target point, passes through the point with the following coordinates:

$$\begin{pmatrix} f_c \\ u_c \\ v_c \end{pmatrix}$$

in the coordinate system associated with the camera where:

$f_c$ is the focal length of the camera, $u_c$ and $v_c$ are the abscissa and ordinate positions of the pixel which depend on a rotation matrix between the coordinate frame associated with the camera and the reference coordinate frame, the rotation matrix depending on the orientation obtained from the aircraft;

the coordinate frame associated with the camera comprises a first camera axis, a second camera axis and a third camera axis, perpendicular to each other, the calculation step of each transfer function comprising, for each camera, the following sub-steps:

calculation of the rotation matrix between the coordinate frame associated with the camera and the reference coordinate frame, based on the aircraft orientation, calculation for any point:

of a first quantity representative of a contribution, along the first camera axis, of the vector linking the origin of the coordinate frame associated with the camera and the target point, a second quantity representative of a contribution, along the second camera axis, of the vector linking the origin of the coordinate frame associated with the camera and the target point, and a third quantity representative of a contribution, along the third camera axis, of the vector linking the target point to the origin of the coordinate frame associated with the camera;

each of the first, second, and third quantities depending on the calculated rotation matrix, determination of the first, second and third coefficients from the first quantity, of the fourth, fifth and sixth coefficients from the second quantity, and of the seventh, eighth and ninth coefficients from the third quantity.

A further subject matter of the invention is a computer program product comprising software instructions which, when executed by a computer, implement such a generation method.

A further subject matter of the invention is an electronic device for generating a peripheral image of an aircraft, the peripheral image including a plurality of pixels obtained from a plurality of cameras equipping the aircraft, the electronic generation device comprising:

a receiver module configured for receiving a position from a peripheral point of view corresponding to the point of view from which the peripheral image is to be generated, an acquisition module configured for obtaining an orientation of the aircraft, an acquisition module configured for acquiring a respective image from each camera, a calculation module configured for calculating a respective transfer function for each camera, each transfer function being intended for being applied to a pixel of the peripheral image, for identifying a possible corresponding pixel in the acquired image associated with the transfer function, and a generation module configured for generating the peripheral image from the images acquired from each camera and from each calculated transfer function.

BRIEF DESCRIPTION OF THE DRAWINGS

Such features and advantages of the invention will become clearer upon reading the following description, given only as a non-limiting example, and made with reference to the enclosed drawings, wherein.

DETAILED DESCRIPTION OF EMBODIMENTS

Figure 1:
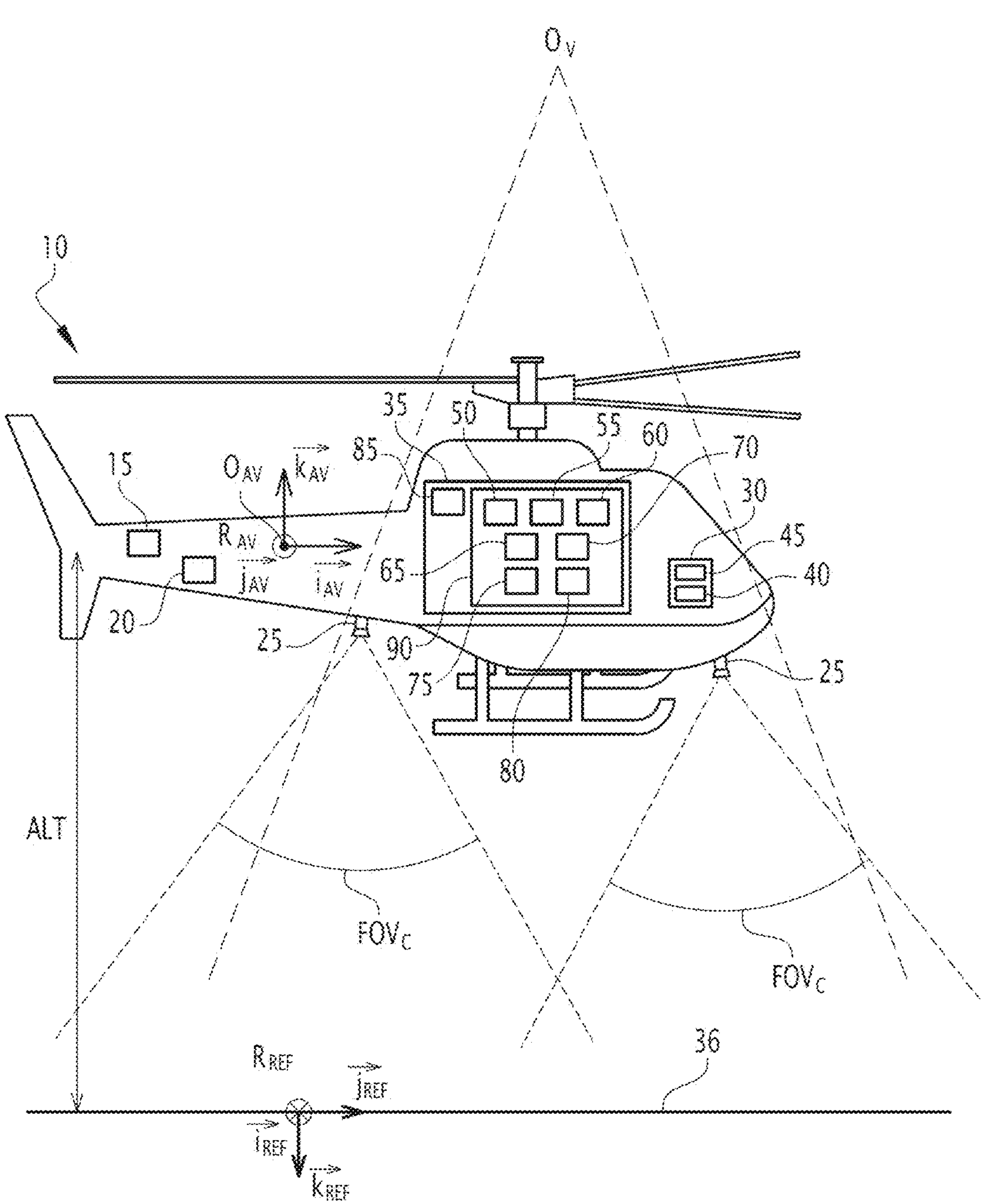
FIG. 1 is a schematic representation of an aircraft comprising a generation device according to the invention.

With reference to FIG. 1, an aircraft 10 is described. The aircraft 10 is e.g. a rotary-wing aircraft, such as a helicopter or a drone, such as a multi-blade drone. In a variant, the aircraft 10 is an aircraft.

The aircraft 10 comprises a gyroscope 15, an altimeter 20, a plurality of cameras 25, a display device 30, and an electronic device 35 for generating a peripheral image of the aircraft 10.

The aircraft 10 is apt to move above a ground 36 to which a reference coordinate frame $R_{REF}$ is associated. The reference coordinate frame $R_{REF}$ comprises a first reference axis $\overrightarrow{i_{REF}}$, a second reference axis $\overrightarrow{J_{REF}}$ and a third reference axis $\overrightarrow{k_{REF}}$, perpendicular to each other.

The gyroscope 15 is configured for measuring an orientation of the aircraft 10. E.g. the gyroscope 15 is configured for measuring a roll angle, a pitch angle, and a yaw angle of the aircraft 10. The roll, pitch and yaw angles are measured with respect to a fixed coordinate frame (not shown) of the aircraft 10. As an optional addition, the gyroscope 15 is configured for converting the measured pitch and yaw angles into an aircraft bearing angle 10 and an aircraft elevation angle 10 relative to the reference coordinate frame $R_{REF}$.

A respective coordinate frame $R_{AV}$ is also associated with the aircraft 10.

The altimeter 20 is e.g. a laser altimeter suitable for measuring the altitude of the aircraft 10 with respect to the ground 36. As an example, the altimeter 20 is configured for measuring the altitude ALT of a center $O_{AV}$ of the aircraft 10 with respect to the ground 36. The center $O_{AV}$ typically forms the origin of the $R_{AV}$ coordinate frame.

The center $O_{AV}$ of the aircraft 10 is e.g. a center of gravity of the aircraft 10.

Each camera 25 is attached to the aircraft 10 and oriented towards the outside of the aircraft 10. A respective coordinate frame $R_C$ is associated with each camera 25. An origin $O_C$ of the coordinate frame $R_C$ associated with a respective camera 25 is e.g. the center of said camera 25. Each coordinate frame $R_C$ comprises a first camera axis $\vec{i}_c$, a second camera axis $\vec{J}_c$ and a third camera axis $\vec{k}_c$, perpendicular to each other.

The cameras 25 are preferentially oriented along directions which are distinct from one another. The different orientation directions of the cameras 25 are used for covering a wider global field of vision.

The distance between the center $O_C$ of each camera 25 and the center $O_{AV}$ of the aircraft 10 is predefined. Similarly, the orientation of the coordinate frame $R_C$ associated with each camera 25 with respect to the coordinate frame $R_{AV}$ associated with the aircraft 10 is also predefined. Thus, for each camera 25, a respective rotation matrix $\hat{R}_i$ between the coordinate frame $R_C$ associated with the camera 25 and the coordinate frame $R_{AV}$ associated with the aircraft 10, is known and predefined.

Each camera 25 defines a respective Field of View $FOV_C$, e.g. substantially equal to 120 degrees. Furthermore, each camera 25 comprises a predefined focal length $f_c$ along the respective first camera axis $\vec{i}_c$. Thereafter, the focal length $f_c$ is called focal length $f_c$.

Each camera 25 is configured for taking, at a predetermined frequency, images of the environment wherein the aircraft 10 is flying. The predetermined frequency is e.g. equal to 20 Hz.

In a variant, the predetermined frequency is greater than 50 Hz, and preferentially equal to 100 Hz. In other words, for each camera 25, an image is e.g. taken by the camera 25 every 0.02 seconds, and preferentially every 0.01 seconds.

The display device 30 comprises e.g. a display screen 40 and a human-machine interface 45.

The display device 30 is intended for being located close to the pilot of the aircraft 10. Thereby, when the pilot is on-board the aircraft 10, the display device 30 is on-board.

On the other hand, when the pilot of the aircraft 10 is distant from the aircraft 10, as e.g. in the case of a drone, the display device 30 is also offset from the aircraft 10. The display module 30 is connected to a generation device 35.

As will be described below, the display screen 40 is configured for receiving the peripheral image from the generation device 35. The display screen 40 is further configured for displaying the peripheral image. The peripheral image display is then intended for the pilot of the aircraft 10.

Each of the peripheral image and of the acquired images comprises a plurality of pixels forming a tiling of the corresponding image. Each pixel comprises a content defining the color of the pixel.

According to a first example, each of the peripheral images or of the acquired images is a color image. The content of each pixel is typically a triplet of RGB values, such as values comprised, respectively, between 0 and 255 if each of said values is encoded on 8 bits. The first value of the RGB triplet corresponds to a level of red. The second value of the RGB triplet corresponds to a level of green. The third value of the RGB triplet corresponds to a level of blue. E.g. if each value of the RGB triplet is equal to 0, then the associated pixel is black, and if each value of the RGB triplet is equal to 255, then the associated pixel is white.

According to the first example, each value of the triplet of RGB values is, in a variant, encoded on 16, 32 or 64 encoding bits. Each respective value is then not comprised between 0 and 255, but between 0 and a limit greater than 255.

According to a second example, each of the peripheral images and the acquired images is a black and white image, also called a grayscale image. The content of each pixel is then a single value, e.g. between 0 and 100, or else between 0 and 255, wherein the maximum value typically corresponds to a white pixel and the minimum value typically corresponds to a black pixel.

The human-machine interface 45 is configured for receiving, from the pilot, instructions relating to a position of a peripheral point of view $O_v$ corresponding to a point of view from which the peripheral image is generated by the generation device 35.

As an optional addition, the human-machine interface 45 is configured for receiving, from the pilot, a peripheral focal length $f_V$ associated with the peripheral point of view $O_V$.

Preferentially, the human-machine interface 45 is configured for further receiving an instruction of a first type or of a second type.

An instruction of the first type is an instruction for tracking the aircraft 10 wherein the peripheral point of view $O_V$ is located above the aircraft 10 at a predefined distance from the aircraft 10. The peripheral point of view $O_v$ then follows the aircraft 10. The first type of instruction is also called surround view. The human-machine interface 45 is then configured for receiving the position of the peripheral point of view $O_V$ in the form of a distance between the aircraft 10 and the peripheral point of view $O_V$, e.g. along the third reference axis $\overrightarrow{k_{REF}}$.

An instruction of the second type is a zone surveillance instruction, wherein the peripheral point of view $O_V$ is fixed with respect to the reference coordinate frame $R_{REF}$ and located above the aircraft 10. According to the second type of instruction, the aircraft 10 is mobile with respect to the peripheral point of view $O_V$. The human-machine interface 45 is then configured for receiving the position from the peripheral point of view $O_V$ in the form of a triplet comprising an altitude H of the peripheral point of view $O_V$ with respect to the ground 36, a longitude and a latitude of the peripheral point of view $O_V$.

The human-machine interface 45 is configured for sending to the generation device 35, the instructions received from the pilot, and the position of the peripheral point of view $O_V$.

The electronic device 35 for generating the peripheral image of the aircraft 10 comprises a receiver module 50, an obtaining module 55, an acquisition module 60, a calculation module 65, a generation module 70, and optionally an addition module 75 and a sending module 80.

In the example shown in FIG. 1, the receiver module 50, the obtaining module 55, the acquisition module 60, the calculation module 65, the generation module 70, and, optionally, the addition module 75 and the sending module 80 are each produced in the form of a software program, or of a software brick, which can be executed by the processor 85. The memory 90 of the generation device 35 is then apt to store a receiving software, an obtaining software, an acquisition software, a calculation software, a generation software, and optionally, an addition software and a sending software.

In a variant (not shown), the receiver module 50, the obtaining module 55, the acquisition module 60, the calculation module 65, the generation module 70 and, optionally, the addition module 75 and the sending module 80 are each produced in the form of a programmable logic component, such as an FPGA (Field Programmable Gate Array), or further in the form of an integrated circuit, such as an ASIC (Application Specific Integrated Circuit).

When the generation device 35 is produced in the form of one or a plurality of software programs, i.e. in the form of a computer program, same is further apt to be recorded on a computer-readable medium (not shown). The computer-readable medium is e.g. a medium apt to store the electronic instructions and to be coupled to a bus of a computer system. As an example, the readable medium is an optical disk, a magneto disk, a ROM memory, a RAM memory, any type of non-volatile memory (e.g. EPROM, EEPROM, FLASH, NVRAM), a magnetic card or an optical card. A computer program containing software instructions is then stored on the readable medium.

The receiver module 50 is configured for receiving, e.g. from the human-machine interface 45, the position of the peripheral point of view $O_V$ corresponding to the point of view from which the peripheral image is to be generated.

E.g., the receiver module 50 is configured for receiving, from the human-machine interface 45, the instruction of the first type. Then, the receiver module 50 is configured for receiving, from the human-machine interface 45, the distance of the peripheral point of view $O_V$ with respect to the center $O_{AV}$ of the aircraft 10.

E.g., the receiver module 50 is configured for receiving, from the human-machine interface 45, the instruction of the second type. The receiver module 50 is then configured for receiving the altitude H of the peripheral point of view $O_V$ with respect to the reference coordinate frame $R_{REF}$, as well as the longitude and latitude of the peripheral point of view $O_V$.

The obtaining module 55 is configured for obtaining, e.g. from the gyroscope 15, the orientation of the aircraft 10. As described hereinabove, the orientation of the aircraft 10 obtained comprises e.g. at least one orientation angle among the roll angle of the aircraft 10, the bearing angle of the aircraft 10 and the elevation angle of the aircraft 10. Preferentially, the obtaining module 55 is configured for obtaining the roll angle of the aircraft 10, the bearing angle of the aircraft 10 and the elevation angle of the aircraft 10 with respect to the reference coordinate frame $R_{REF}$.

E.g., the obtaining module 55 is configured for obtaining the altitude ALT of the aircraft 10 from the altimeter 20.

The acquisition module 55 is configured for acquiring, from each camera 25, a respective image, called acquired image.

The calculation module 65 is configured for receiving a respective transfer function for each camera 25. Each transfer function is intended for being applied to a pixel of the peripheral image, for identifying a possible corresponding pixel in the acquired image associated with the transfer function.

E.g., each transfer function associates the abscissa position $u_v$ and the ordinate position $v_v$ of a pixel of the peripheral image, the abscissa position $u_c$ and the ordinate position $v_c$ of a possible corresponding pixel in the acquired image associated with the transfer function.

Preferentially, each transfer function satisfies:

$$u_c = \frac{a_u + b_u u_v + c_u v_v}{a' + b' u_v + c' v_v} \quad \text{[Math 1]}$$

and $$v_c = \frac{a_v + b_v u_v + c_v v_v}{a' + b' u_v + c' v_v} \quad \text{[Math 2]}$$

where $u_c$ is the abscissa position of the pixel of the image acquired by the camera 25, $v_c$ is the ordinate position of the pixel of the image acquired by the camera 25, $u_v$ is the abscissa position of the pixel of the peripheral image, $v_v$ is the ordinate position of the pixel of the peripheral image, a', b', c', $a_u$, $b_u$, $c_u$, $a_v$, $b_v$, $c_v$ are first to ninth coefficients specific to each camera 25.

It should be noted that the denominator of each fraction of the transfer function is the same, the denominator is called thereafter common denominator, and is denoted by DEN. The common denominator DEN satisfies in particular:

$$\text{DEN}=a'+b'u_v+c'v_v \quad \text{[Math 3]}$$

Before describing the calculation module 65 in greater detail, the geometric principle behind each transfer function is explained with reference to FIG. 2.

Figure 2:
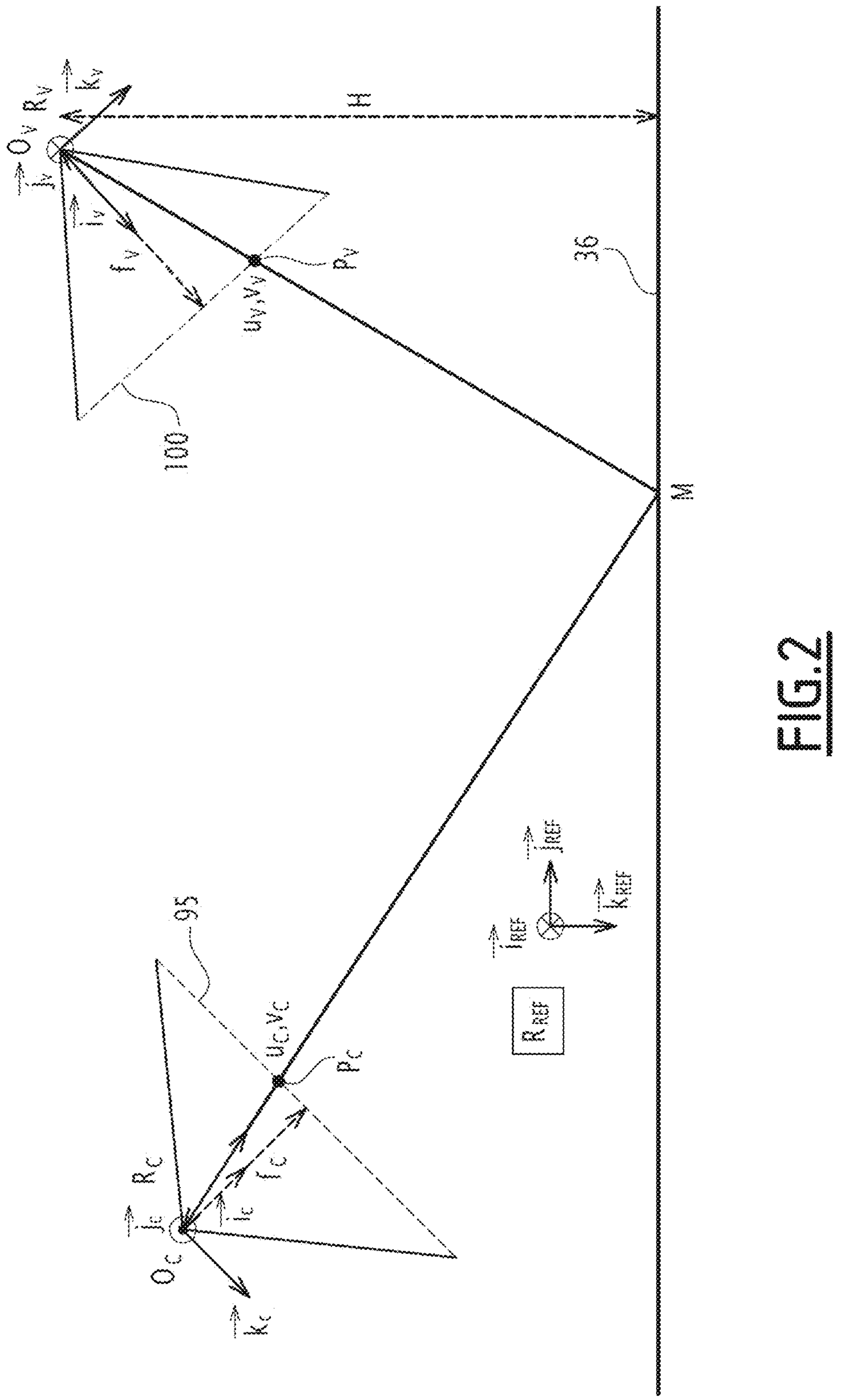
FIG. 2 is a schematic view explaining a step of calculating a respective transfer function for each camera, of a generation method implemented by the electronic generation device shown in FIG. 1.

In FIG. 2, the coordinate frame $R_C$ associated with a respective camera 25 is shown on the left. The origin of the coordinate frame $R_C$ is the center $O_C$ of the camera 25. On the right-hand side of FIG. 2 the peripheral point of view $O_V$ and the associated coordinate frame $R_V$ thereof are shown. The peripheral coordinate frame $R_V$ comprises a first peripheral axis $\vec{i_v}$, a second peripheral axis $\vec{j_v}$ and a third peripheral axis $\vec{k_v}$, perpendicular to each other.

FIG. 2 also shows a target point M on the ground 36. Respective straight lines link the target point M and each of the center $O_C$ of the camera 25 and of the peripheral point of view $O_V$.

The straight line linking the target point M and the center $O_C$ of the camera 25 intersects a respective first plane 95 of the coordinate frame $R_C$ associated with the camera 25, in a first intersection point $P_C$. The first plane 95 corresponds to the image acquired by said camera 25. The first plane 95 is perpendicular to the first camera axis $\vec{i}_c$.

The vector $\overrightarrow{O_C P_C}$ satisfies, in the frame $R_C$ associated with the camera 25, $$(\overrightarrow{O_C P_C})_C = \begin{pmatrix} f_c \\ u_c \\ v_c \end{pmatrix} \quad \text{[Math 4]}$$

where:

$u_c$ and $v_c$ are the abscissa and ordinate positions of the pixel associated with the point $P_C$ in the acquired image, and $(\overrightarrow{O_C P_C})_C$ is the vector $\overrightarrow{O_C P_C}$ expressed in the coordinate frame $R_C$.

The straight line linking the target point M and the peripheral point of view $O_V$ intersects a respective second plane 100 of the peripheral coordinate frame $R_V$ at a second intersection point $P_V$. The second plane 100 corresponds to the peripheral image to be generated. The second plane 100 is perpendicular to the first peripheral axis $\vec{i}_v$.

The vector $\overrightarrow{O_V P_V}$ verifies, in the peripheral frame $R_V$, $$(\overrightarrow{O_V P_V})_V = \vec{d_V} = \begin{pmatrix} f_v \\ u_v \\ v_v \end{pmatrix} \quad \text{[Math 5]}$$

where:

$u_v$ and $v_v$ are the abscissa and ordinate positions of the pixel associated with the point $P_V$ in the peripheral image, and $(\overrightarrow{O_V P_V})_V$ is the vector $\overrightarrow{O_V P_V}$ expressed in the peripheral coordinate frame $R_V$.

In a clever way, it is noted that the vector $\overrightarrow{O_C M}$ is equal to the sum of the vectors $\overrightarrow{O_C O_V}$ and $\overrightarrow{O_V M}$.

It will then be noted, in a clever way, that the vector $\overrightarrow{O_V M}$ is proportional to the vector $\overrightarrow{O_V P_V}$. Given such proportionality relationship, the vector $\overrightarrow{O_V M}$ satisfies the following relationship in the coordinate frame $R_C$ associated with the camera 25

$$(\overrightarrow{O_V M})_C = \frac{H}{\langle \overrightarrow{O_V P_V}, \hat{R}_V \vec{K} \rangle} \hat{R}_V^T \hat{R}_C \vec{d_V} \quad \text{[Math 6]}$$

where:

H is the altitude from the peripheral point of view $O_V$, $\langle .,. \rangle$ is the scalar product operator, $\hat{R}_C$ Is the rotation matrix between the coordinate frame $R_C$ associated with the camera 25 and the reference coordinate frame $R_{REF}$, $\hat{R}_V$ is the rotation matrix between the peripheral coordinate frame $R_V$ and the reference coordinate frame $R_{REF}$, $^T$ is the transposed operator, $\vec{K}$ is the predefined vector $$\begin{pmatrix} 0 \\ 0 \\ 1 \end{pmatrix},$$

and $(\overrightarrow{O_V M})_C$ is the vector $\overrightarrow{O_V M}$expressed in the coordinate frame $R_C$ associated with the camera 25.

Thus, the vector $(\overrightarrow{O_V M})_C$ expressed in the coordinate frame $R_C$ associated with the camera 25, depends on the vector $\vec{d}_V$, and thus on the abscissa $u_v$ and ordinate $v_v$ position of the pixel in the peripheral image.

Furthermore, it is noted that the vector $\overrightarrow{O_C O_V}$ is independent of the positions of the pixels in the peripheral image and in the acquired image. More particularly, the vector $\overrightarrow{O_C O_V}$ is equal to the sum of the vector $\overrightarrow{O_C O_{AV}}$ and of the vector $\overrightarrow{O_{AV} O_V}$.

Now, the vector $\overrightarrow{O_C O_{AV}}$ is known because it is predefined. Indeed, the vector $\overrightarrow{O_C O_{AV}}$ depends solely on the position of the camera 25 with respect to the center $O_{AV}$ of the aircraft 10.

The vector $\overrightarrow{O_{AV} O_V}$ depends on the position obtained from the peripheral point of view $O_V$ with respect to the center $O_{AV}$ of the aircraft 10.

If the instruction received from the human-machine interface 45 is of the first type, the vector $\overrightarrow{O_{AV} O_V}$ is a vertical vector in the reference coordinate frame $R_{REF}$ of which a norm is equal to the distance obtained from the peripheral point of view $O_V$ with respect to the center $O_{AV}$ of the aircraft 10. Thus, the vector $\overrightarrow{O_{AV} O_V}$ in the coordinate frame $R_C$ associated with the camera 25 satisfies, $$(\overrightarrow{O_{AV} O_V})_C = \hat{R}_i^T \hat{R}_{AV}^T (\overrightarrow{O_{AV} O_V})_{REF} \quad \text{[Math 7]}$$

where:

$\hat{R}_i$ is the rotation matrix between the coordinate frame $R_C$ associated with the camera 25 and the coordinate frame $R_{AV}$ associated with the aircraft 10, $\hat{R}_{AV}$ is the rotation matrix between the coordinate frame $R_{AV}$ associated with the aircraft 10 and the reference coordinate frame $R_{REF}$, and $(\overrightarrow{O_{AV} O_V})_{REF}$ is the vector $\overrightarrow{O_{AV} O_V}$ expressed in the reference coordinate frame $R_{REF}$, and is constant.

If the instruction received from the human-machine interface 45 is of the second type, the vector $\overrightarrow{O_{AV} O_V}$ is variable over time, as a function of the position of the center $O_{AV}$ of the aircraft 10 with respect to the ground 36.

Thus, the vector $\overrightarrow{O_{AV} O_V}$ is e.g. determined by transforming the triplet obtained, comprising the altitude H, the longitude and the latitude, into Cartesian coordinates in the reference coordinate frame $R_{REF}$ centered on the center $O_{AV}$ of the aircraft 10, for obtaining the vector $\overrightarrow{O_{AV} O_V}$ expressed in the reference coordinate frame $R_{REF}$. The vector $\overrightarrow{O_{AV} O_V}$ expressed in the coordinate frame $R_C$ associated with the camera 25 is then obtained by applying equation (7).

In each of the aforementioned cases, the vector $\overrightarrow{O_C O_V}$ expressed in the coordinate frame $R_C$ associated with the camera 25 thus satisfies:

$$(\overrightarrow{O_C O_V})_C = \hat{R}_i^T (\overrightarrow{O_C O_{AV}})_{AV} + \hat{R}_i^T \hat{R}_{AV}^T (\overrightarrow{O_{AV} O_V})_{REF} \quad \text{[Math 8]}$$

By cleverly noting that the vector $\overrightarrow{O_C M}$ is collinear with the vector $\overrightarrow{O_C P_C}$, the ratio between the respective components of the vectors $\overrightarrow{O_C M}$ and $\overrightarrow{O_C P_C}$ are equal. In other words, the ratio between the second component and the first component of the vector $\overrightarrow{O_C M}$ is equal to the ratio between the second component and the first component of the vector $\overrightarrow{O_C P_C}$. Similarly, the ratio between the third component and the first component of the vector $\overrightarrow{O_C M}$ is equal to the ratio between the third component and the first component of the vector $\overrightarrow{O_C P_C}$.

The following equations are then deduced therefrom.

$$\frac{u_c}{f_c} = \frac{\left\langle (\overrightarrow{O_V O_V})_C + \frac{H}{\left\langle (\overrightarrow{O_V P_V})_V, \hat{R}_V^T \vec{K} \right\rangle} \hat{R}_C^T \hat{R}_V \overrightarrow{d_V}, \vec{J} \right\rangle}{\left\langle (\overrightarrow{O_V O_V})_C + \frac{H}{\left\langle (\overrightarrow{O_V P_V})_V, \hat{R}_V^T \vec{K} \right\rangle} \hat{R}_C^T \hat{R}_V \overrightarrow{d_V}, \vec{I} \right\rangle} \quad \text{[Math 9]}$$

$$\frac{v_c}{f_c} = \frac{\left\langle (\overrightarrow{O_C O_V})_C + \frac{H}{\left\langle (\overrightarrow{O_V P_V})_V, \hat{R}_V^T \vec{K} \right\rangle} \hat{R}_C^T \hat{R}_V \overrightarrow{d_V}, \vec{K} \right\rangle}{\left\langle (\overrightarrow{O_C O_V})_C + \frac{H}{\left\langle (\overrightarrow{O_V P_V})_V, \hat{R}_V^T \vec{K} \right\rangle} \hat{R}_C^T \hat{R}_V \overrightarrow{d_V}, \vec{I} \right\rangle} \quad \text{[Math 10]}$$

where:

$\vec{I}$ is the vector $$\begin{pmatrix} 1 \\ 0 \\ 0 \end{pmatrix},$$

and $\vec{J}$ is the vector $$\begin{pmatrix} 0 \\ 1 \\ 0 \end{pmatrix}.$$

A clever factorization of equations (9) and (10) makes it possible to write the following equations.

$$u_c = \frac{\langle \overrightarrow{d_V}, \vec{B} \rangle}{\langle \overrightarrow{d_V}, \vec{A} \rangle} \quad \text{[Math 11]}$$

$$v_c = \frac{\langle \overrightarrow{d_V}, \vec{C} \rangle}{\langle \overrightarrow{d_V}, \vec{A} \rangle} \quad \text{[Math 12]}$$

where $\vec{A}$, $\vec{B}$ and $\vec{C}$ are first to third quantities satisfying, $$\vec{A} = \langle (\overrightarrow{O_C O_V})_C, \vec{I} \rangle \widehat{R_V}^T \vec{K} + H \widehat{R_V}^T \widehat{R_C} \vec{I} \quad \text{[Math 13]}$$

$$\vec{B} = f_c \langle (\overrightarrow{O_C O_V})_C, \vec{J} \rangle \widehat{R_V}^T \vec{K} + f_c H \widehat{R_V}^T \widehat{R_C} \vec{J} \quad \text{[Math 14]}$$

$$\vec{C} = \langle (\overrightarrow{O_C O_V})_C, \vec{K} \rangle \widehat{R_V}^T \vec{K} + f_c H \widehat{R_V}^T \widehat{R_C} \vec{K} \quad \text{[Math 15]}$$

The first quantity $\vec{A}$ is representative of a contribution, along the first camera axis $\vec{I_c}$, of the vector $\overrightarrow{O_C M}$ linking the origin $O_C$ of the coordinate frame $R_C$ associated with the camera 25 and the target point M. More particularly, the scalar product between the first quantity $\vec{A}$ and the vector $\vec{d_V}$ is equal to the component of the vector $\overrightarrow{O_C M}$ along the first camera axis $\vec{I_c}$.

The second quantity $\vec{B}$ is representative of a contribution, along the second camera axis $\vec{J_c}$, of the vector $\overrightarrow{O_C M}$ linking the origin $O_C$ of the frame $R_C$ associated with the camera 25 and the target point M. More particularly, the scalar product between the second quantity $\vec{B}$ and the vector $\vec{d_V}$ is equal to the product between the component of the vector $\overrightarrow{O_C M}$ along the second camera axis $\vec{J_c}$ and the focal length $f_c$ of the camera 25.

The third quantity $\vec{C}$ is representative of a contribution, along the third camera axis $\vec{k_c}$, of the vector $\overrightarrow{O_C M}$ linking the origin $O_C$ of the frame $R_C$ associated with the camera 25 and the target point M. More particularly, the scalar product between the third quantity $\vec{C}$ and the vector $\vec{d_V}$ is equal to the product between the component of the vector $\overrightarrow{O_C M}$ along the third camera axis $\vec{k_c}$ and the focal length $f_c$ of the camera 25.

It is then noted that the first to third quantities, $\vec{A}$, $\vec{B}$, $\vec{C}$ are independent of the abscissa $u_v$ and ordinate $v_v$ positions of any pixel of the peripheral image. Thus, the quantities $\vec{A}$, $\vec{B}$, $\vec{C}$ are, for a defined acquired image, constant for all pixels of the peripheral image to be generated.

It is clear that the elements described hereinabove are applicable to each image acquired from a respective camera 25.

Again with reference to FIG. 1, the calculation module 65 is configured for calculating, for each camera 25, the rotation matrix $\hat{R}_C$ between the coordinate frame $R_C$ associated with said camera 25 and the reference coordinate frame $R_{REF}$, from the orientation obtained from the gyroscope 15.

To this end, the calculation module 65 is configured e.g. for calculating the rotation matrix $\hat{R}_{AV}$ between the coordinate frame $R_{AV}$ associated with the aircraft 10 and the reference coordinate frame $R_{REF}$, from the orientation obtained from the gyroscope 15, preferentially from at least one angle among the roll angle of the aircraft 10, the bearing angle of the aircraft 10 and the elevation angle of the aircraft 10, more preferentially from each of the roll angle of the aircraft 10, the bearing angle of the aircraft 10 and the elevation angle of the aircraft 10.

The calculation module 65 is configured e.g. for calculating the product between the last rotation matrix $\hat{R}_{AV}$ and the predefined rotation matrix $\hat{R}_i$ between the coordinate frame $R_C$ associated with each camera 25 and the coordinate frame $R_{AV}$ associated with the aircraft 10.

As an optional addition, the calculation module 65 is configured for calculating the rotation matrix $\hat{R}_V$ between the peripheral coordinate frame $R_V$ and the reference coordinate frame $R_{REF}$, from the rotation matrix $\hat{R}_{AV}$ between the coordinate frame $R_{AV}$ associated with the aircraft 10 and the reference coordinate frame $R_{REF}$.

E.g., the calculation module 65 is configured for calculating, if the instruction received from the human-machine interface 45 is of the first type, said rotation matrix $\hat{R}_V$ wherein the bearing angle associated with the matrix $\hat{R}_V$ is equal to the bearing angle of the aircraft 10, the elevation angle associated with the matrix $\hat{R}_V$ is equal to −90° and the roll angle associated with the matrix $\hat{R}_V$ is equal to 0°.

E.g., the calculation module 65 is configured for calculating, if the instruction received from the human-machine interface 45 is of the second type, said rotation matrix $\hat{R}_V$ wherein the bearing angle associated with the matrix $\hat{R}_V$ is equal to 0°, the elevation angle associated with the matrix $\hat{R}_V$ is equal to −90° and the roll angle associated with the matrix $\hat{R}_V$ is equal to 0°.

As an optional complement, the calculation module 65 is configured for calculating the vector $\overrightarrow{O_C O_V}$, in the frame $R_C$ associated with the camera 25, from the position obtained from the peripheral point of view $O_V$, e.g. according to equation (8).

As an optional addition, the calculation module 65 is configured for calculating the altitude H of the peripheral point of view $O_V$ from the altitude ALT of the aircraft 10 and/or from the position received from the peripheral point of view $O_V$.

To this end, the calculation module 65 is configured e.g. for determining, if the instruction received is of the first type, the altitude H of the peripheral point of view $O_V$ as being the sum of the altitude ALT of the aircraft 10 and of the distance received from the human-machine interface 45.

To this end, the calculation module 65 is configured e.g. for determining, if the instruction received is of the second type, the altitude H of the peripheral point of view $O_V$ as being the altitude H received from the human-machine interface 45.

The calculation module 65 is configured for then calculating the first $\vec{A}$, second $\vec{B}$ and third $\vec{C}$ quantities according to equations (13), (14) and (15), taken in combination with equation (8). As a reminder, in equations (8), (13), (14) and (15), the matrix $\hat{R}_i$, the vector $(\overrightarrow{O_C O_{AV}})_{AV}$ in the coordinate frame $R_{AV}$ associated with the aircraft 10, the vector $\vec{I}$, the vector $\vec{J}$, the vector $\vec{K}$ and the focal length $f_C$ are constant and predetermined.

The calculation module 65 is configured for determining the first a', second b' and third c' coefficients from the first quantity $\vec{A}$. To this end, the first coefficient a' is e.g. equal to the product between the first component of the first quantity $\vec{A}$ and the focal length $f_V$ associated with the peripheral point of view $O_V$. The second coefficient b' is e.g. equal to the second component of the first quantity $\vec{A}$. The third coefficient c' is e.g. equal to the third component of the first quantity $\vec{A}$.

The calculation module 65 is further configured for determining the fourth $a_u$, fifth $b_u$ and sixth $c_u$ coefficients from the second quantity $\vec{B}$. The fourth coefficient $a_u$ is e.g. equal to the product between the first component of the second quantity $\vec{B}$ and the focal length $f_V$ associated with the peripheral point of view $O_V$. The fifth coefficient $b_u$ is e.g. equal to the second component of the second quantity $\vec{B}$. The sixth coefficient $c_u$ is e.g. equal to the third component of the second quantity $\vec{B}$.

The calculation module 65 is configured for determining the seventh $a_v$, eighth $b_v$ and ninth $c_v$ coefficients from the third quantity $\vec{C}$ The seventh coefficient $a_v$ is e.g. equal to the product between the first component of the third quantity $\vec{C}$ and the focal length $f_V$ associated with the peripheral point of view $O_V$. The eighth coefficient $b_v$ is e.g. equal to the second component of the third quantity $\vec{C}$. The ninth coefficient $c_v$ is e.g. equal to the third component of the third quantity $\vec{C}$.

The calculation module 65 is configured for performing the preceding calculations and determinations for each camera 25.

The generation module 70 is configured for generating the peripheral image from the images acquired from each camera 25 and from each calculated transfer function.

The generation module 70 is configured for applying, to each pixel of the peripheral image, the transfer function associated with each respective camera 25. In other words, “each pixel of the peripheral image” means each pair of positions with abscissa $u_v$ and ordinate $v_v$ of a pixel of the peripheral image.

Preferentially, the generation module 70 is configured for performing the following actions for each transfer function.

The generation module 70 is configured for calculating, for each pixel of the peripheral image, i.e. for each pair $u_v$, $v_v$, the scalar product between the vector $\overrightarrow{O_V P_V}$ and the vector $\vec{K}$, as defined hereinabove, called verification scalar product. To this end, the generation module 70 is configured for calculating the vector $\vec{K}$ in the peripheral frame of reference $R_V$, e.g. using the rotation matrix $\hat{R}_V$ between the peripheral frame of reference $R_V$ and the reference coordinate frame $R_{REF}$. Indeed, a scalar product between two vectors can be calculated only if said vectors are expressed in the same coordinate frame. Thus, the generation module 70 is configured e.g. for performing the following calculation.

$$\langle \vec{d}_V, \hat{R}_V \vec{K} \rangle \quad \text{[Math 16]}$$

If the verification scalar product calculated according to equation (16) is negative or zero, the generation module 70 is configured for determining an incorrect result for the application of said transfer function to said pixels of the peripheral image. The incorrect result is e.g. a predetermined value, such as the value 0.

If the verification scalar product is strictly positive, the generation module 70 is configured for, then calculating the common denominator DEN according to equation (3).

If the calculated common denominator DEN is negative or zero, the generation module 70 is configured for then determining the incorrect result for the application of the transfer function to the pixel of the peripheral image.

If the calculated common denominator DEN is strictly positive, the generation module 70 is configured for then applying equations (1) and (2) respectively, to the position $u_v$, and $v_v$, respectively, of the pixel of the peripheral image.

The generation module 70 is then configured for verifying that the position $u_c$, $v_c$ resulting from equations (1) and (2) indeed corresponds to a pixel appearing in the acquired image.

If the pixel associated with the calculated position $u_c$, $v_c$ does not appear in the acquired image, then the generation module 70 is configured for determining the incorrect result. If the calculated position $u_c$, $v_c$ indeed corresponds to a pixel of the acquired image, then the generation module 70 is configured for determining the position $u_c$, $v_c$ as the result of the application of the transfer function to the pixel of the peripheral image.

The generation module 70 is configured for performing the preceding steps for each pixel of the peripheral image. In other words, the generation module 70 is configured for scanning the peripheral image, and for calculating, for each pixel of said scanning, the position $u_c$, $v_c$ of the pixel in the acquired image or the incorrect result, where appropriate. "Valid result" refers to the position $u_c$, $v_c$ if same corresponds to a pixel appearing in the acquired image.

The generation module 70 is configured for performing such a scanning for each camera 25, and thus for each associated transfer function.

The generation module 70 is configured for, following the application of each transfer function to each pixel of the peripheral image, applying a mixing rule between the acquired images, according to the number of valid result(s).

For a better understanding, the mixing rule is described only for one pixel of the peripheral image. It is clear that the generation module 70 is configured for applying the mixing rule for each pixel of the peripheral image.

The mixing rule is as follows:

- if the application of each transfer function to the pixel of the peripheral image provides the position of a pixel in only one acquired image, i.e. a single valid result, then the content of said pixel of the peripheral image is equal to the content of the pixel of the corresponding only one acquired image,
- if the application of each transfer function to the pixel of the peripheral image provides pixels for a plurality of acquired images, i.e. a plurality of valid results, then the content of the pixel of the peripheral image is equal to the content of the pixel of the acquired image which is the most central in the respective acquired image thereof, and
- otherwise, the pixel of the peripheral image is equal to a predefined color.

The predefined color is e.g. black.

Figure 3:
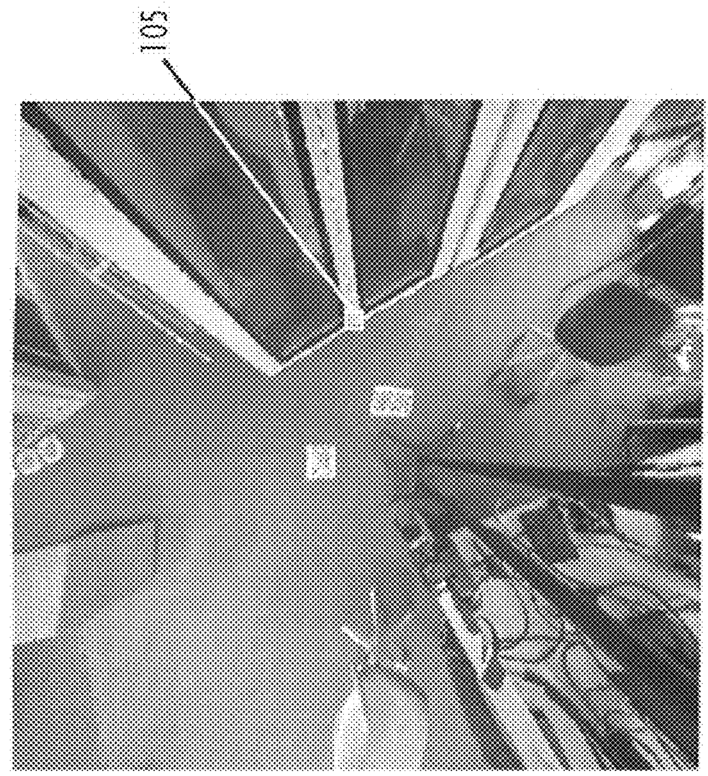
FIG. 3 is an example of a peripheral image generated by the electronic generation device shown in FIG. 1, from images acquired from a plurality of cameras onboard the aircraft shown in FIG. 1.
Figure 3:
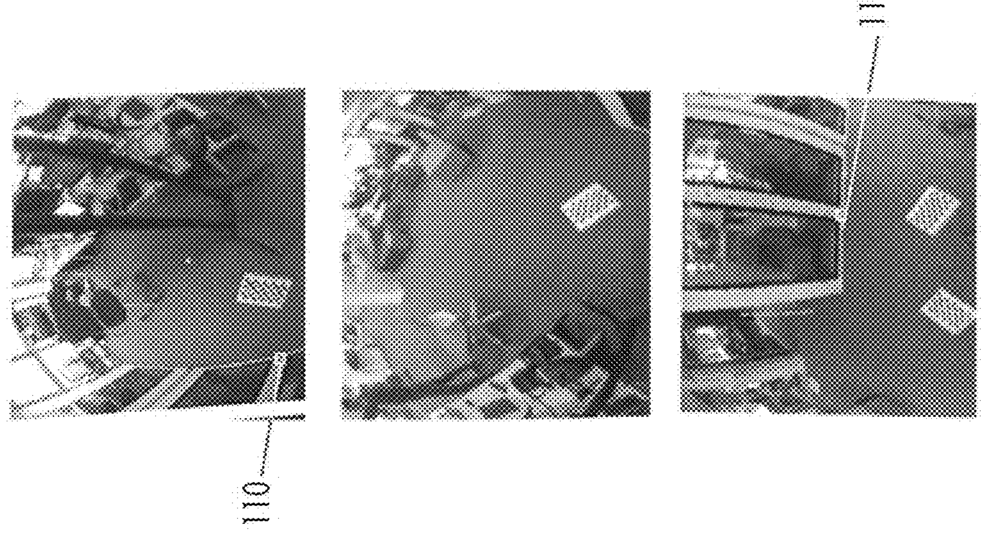

FIG. 3 shows on the left, three images acquired by respective cameras 25, and on the right, the peripheral image generated.

FIG. 3 shows an example of actually acquired images and an actually generated peripheral image. Thereby, FIG. 3 is intended only for illustrating a concrete example of generation of a peripheral image from images actually acquired. FIG. 3 is then purely illustrative and is thus not essential for understanding the invention.

With reference to FIG. 3, the pixel 105 of the peripheral image corresponds to the pixel 110 of the images acquired at the top left and at the bottom left of FIG. 3. The generation module 70 is configured for, in such a case, selecting the pixel 110 of the image acquired at the bottom left of FIG. 3 because it is in said acquired image that the pixel is the most central with respect to the respective image thereof, i.e. closest to the center of the respective image.

Thereby, the generation module 70 is configured for generating the complete peripheral image wherein each pixel either comes from a respective acquired image or is of the predefined color. Thereby, in the generated peripheral image, the zones of the predefined color correspond to the zones for which no camera 25 has visibility.

As an optional addition, the addition module 75 is configured for adding, in the generated peripheral image, a symbol representing the aircraft 10.

The addition module 75 is configured for determining the size and the position of the symbol representing the aircraft 10 in the peripheral image. To this end, the addition module 75 is configured e.g. for determining the size of the symbol representing the aircraft 10 from the position received from the peripheral point of view $O_V$. E.g., the addition module 75 is configured for determining the size from the altitude H from the peripheral point of view $O_V$, the focal length $f_V$ associated with the peripheral point of view $O_V$ and a predefined dimension of the aircraft 10.

If the aircraft 10 is a helicopter, the predefined dimension is e.g. twice the length of each blade. The predefined dimension corresponds to the diameter of the disk formed by the rotation of the blades.

In a variant, if the aircraft 10 is an aircraft, the predefined dimension is e.g. the wingspan of the wings of the aircraft.

The addition module 75 is configured e.g. for calculating the ratio between the focal length $f_V$ associated with the peripheral point of view $O_V$ and the altitude H of the peripheral point of view $O_V$, and for multiplying the ratio by the predefined dimension, so as to obtain the size of the symbol representing the aircraft 10.

Preferentially, the addition module 75 is configured for converting the size of the calculated symbol into a corresponding number of pixel(s) according to a size represented by each pixel.

The addition module 75 is further configured for determining the position of the symbol representing the aircraft 10 in the peripheral image.

E.g., if the instruction received from the HMI 45 is of the first type, the addition module 75 is configured for determining the position of the symbol as being in the center of the peripheral image. Indeed, in the case where the peripheral point of view $O_V$ follows the aircraft 10, the symbol is systematically placed in the center of the generated peripheral image.

E.g., if the instruction received from the human-machine interface 45 is of the second type, the addition module 75 is configured for determining the position of the symbol representing the aircraft 10, from the vector $\overrightarrow{O_{AV}O_V}$.

The addition module 75 is then configured for including in the peripheral image, the symbol representing the aircraft 10 at the determined size and position.

The sending module 80 is configured for sending the generated peripheral image, to which the symbol representing the aircraft 10 is added, if appropriate, to the display screen 40 of the display device 30. The peripheral image is intended for being displayed by the display screen 40, intended for the pilot of the aircraft 10, as explained hereinabove.

Figure 4:
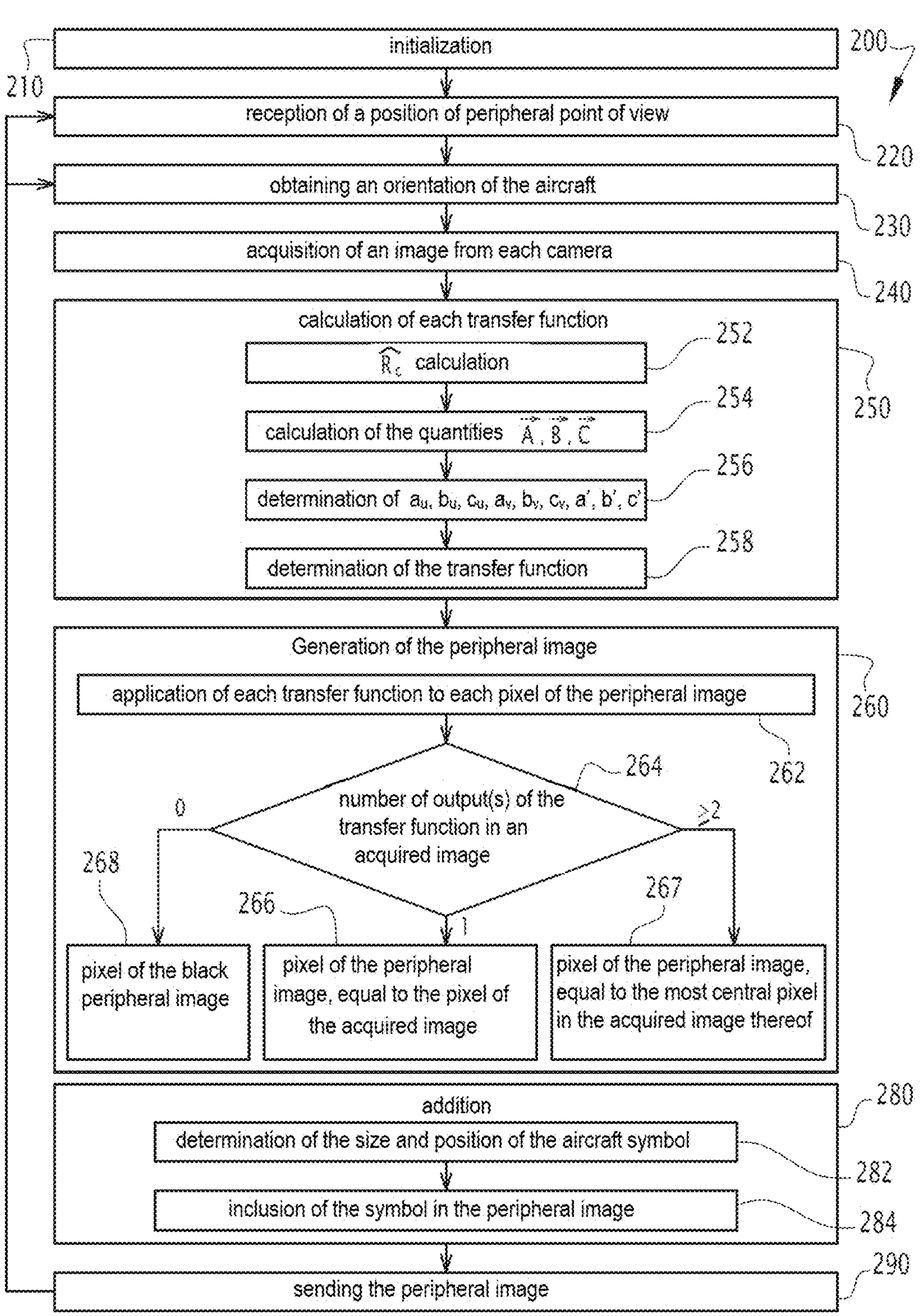
FIG. 4 is a flow chart of a generation method according to the invention, the aircraft being implemented by the electronic generation device shown in FIG. 1.

The operation of the electronic generation device 35 will now be described through a generation method 200, a flow chart of which is shown in FIG. 4.

The aircraft 10 flies above the ground 36. The cameras 25 take images, e.g. at a frequency of 20 Hz, 50 Hz or 100 Hz. The gyroscope 15 measures the orientation of the aircraft 10, and preferentially the roll angle thereof, the bearing angle thereof and the elevation angle thereof with respect to the reference coordinate frame $R_{REF}$. The altimeter 20 of the aircraft 10 measures the altitude ALT of the aircraft 10 with respect to the ground 36, in the reference coordinate frame $R_{REF}$.

During an initialization step 210, the generation device 35 obtains, for each camera 25, the focal length $f_c$ of the camera 25 and the vector $\overrightarrow{O_CO_{AV}}$ linking the center $O_C$ of the camera 25 to the center $O_{AV}$ of the aircraft 10. During the initialization step 210, the generation device 35 also obtains the rotation matrix $\hat{R}_i$ between the coordinate frame $R_C$ associated with the camera 25 and the coordinate frame $R_{AV}$ associated with the aircraft 10.

The pilot of the aircraft 10 then selects the peripheral point of view $O_V$ and optionally the type of instruction and/or the focal length $f_v$ associated with the peripheral point of view $O_V$, via the human-machine interface 45.

During a reception step 220, the receiver module 50 receives, e.g. from the human-machine interface 45, the position of the peripheral point of view $O_V$ and, where appropriate, the type of instruction and/or focal length $f_v$ associated with the peripheral point of view $O_V$ selected by the pilot.

During an obtaining step 230, the obtaining module 55 obtains the orientation of the aircraft 10 with respect to the reference coordinate frame $R_{REF}$, e.g. from the gyroscope 15 and preferentially the altitude ALT of the aircraft 110 from the altimeter 20.

During an acquisition step 240, the acquisition module 60 acquires, from each camera 25, a respective acquired image.

During a computation step 250, the calculation module 65 calculates each transfer function. Each transfer function is defined by equations (1) and (2).

During the calculation step 250, the calculation module 65 calculates each of the first to ninth coefficients a', b', c', $a_u$, $b_u$, $c_u$, $a_v$, $b_v$ and $c_v$, for each camera 25.

To this end, the calculation step 250 comprises a first calculation sub-step 252 during which the calculation module 65 calculates the rotation matrix $\hat{R}_c$ between the coordinate frame $R_C$ associated with each camera 25 and the reference coordinate frame $R_{REF}$. To this end, the calculation module 65 calculates, e.g., said matrix $\hat{R}_c$ from the rotation matrix $\hat{R}_i$ between the coordinate frame $R_c$ associated with the camera 25 and the coordinate frame $R_{AV}$ associated with the aircraft 10 obtained previously, and calculates the rotation matrix $R_{AV}$ between the coordinate frame $R_{AV}$ associated with the aircraft 10 and the reference coordinate frame $R_{REF}$ dependent on the orientation obtained from the aircraft 10, as explained hereinabove.

As an optional complement, during the first calculation sub-step 252, the calculation module 65 calculates the rotation matrix $\hat{R}_V$ between the peripheral coordinate frame $R_V$ and the reference coordinate frame $R_{REF}$, the altitude H of the peripheral point of view $O_V$ with respect to the ground 36 and the vector $\overrightarrow{O_C O_V}$ expressed in the coordinate frame $R_C$ associated with the camera 25. During the first calculation sub-step 252, the calculation of the aforementioned elements depends on the type of instruction received from the human-machine interface 45, as explained hereinabove.

Then, during a second calculation sub-step 254, the calculation module 65 calculates the first $\vec{A}$, second $\vec{B}$ and third $\vec{C}$ quantities, from the rotation matrix $\hat{R}_c$ between the coordinate frame $R_C$ associated with each camera 25 and the reference coordinate frame $R_{REF}$, and optionally from the focal length $f_c$ associated with the camera 25, from the rotation matrix $\hat{R}_V$ between the peripheral coordinate frame $R_V$ and the reference coordinate frame $R_{REF}$, from the altitude H of the peripheral point of view $O_V$, from the vector $\overrightarrow{O_C O_V}$ expressed in the coordinate frame $R_C$ associated with the camera 25, and from the three predefined vectors, $\vec{I}$, $\vec{J}$ and $\vec{K}$. To this end, the calculation module 65 applies e.g. equations (13), (14) and (15).

Then, during a first determination sub-step 256, the calculation module 65 determines, from the first $\vec{A}$, second $\vec{B}$ and third $\vec{C}$ quantities, the first to ninth coefficients a', b', c', $a_u$, $b_u$, $c_u$, ay, $b_v$ and $c_v$, as explained hereinabove.

Then, during a second determination sub-step 258, the calculation module 65 determines the transfer function associated with the camera 25, via equations (1) and (2).

The first calculation sub-step 252, the second calculation sub-step 254, the first determination sub-step 256 and the second determination sub-step 258 are performed for each camera 25.

Then, during a generation step 260, the generation module 70 generates the peripheral image from the images acquired from each camera 25 and from each transfer function calculated during the calculation step 250.

To this end, the generation step 260 comprises, for each pixel of the peripheral image, the following sub-steps.

In an application sub-step 262, each respective transfer function is applied to the pixel of the peripheral image.

E.g., the generation module 70 first calculates the verification scalar product, e.g. from the vector $\vec{d_V}$, the rotation matrix $\hat{R}_V$ between the peripheral coordinate frame $R_V$ and the reference coordinate frame $R_{REF}$, and the vector $\vec{K}$. Said verification scalar product is calculated according to equation (16). If the verification scalar product is negative or zero, then the generation module 70 determines the incorrect result for applying the transfer function to the pixel of the peripheral image.

If the verification scalar product is strictly positive, the generation module 70 calculates the common denominator DEN, e.g. according to equation (3). If the common denominator DEN is negative or zero, then the generation module 70 determines the incorrect result for the application of the transfer function to the pixel of the peripheral image.

If the common denominator DEN is strictly positive, then the generation module 70 calculates the position $u_c$, $v_c$ of the pixel of the corresponding acquired image, e.g. according to equations (1) and (2).

Thereby, each transfer function provides either the position $u_c$, $v_c$ of a pixel of the acquired image corresponding to the pixel of the peripheral image, or the incorrect result.

The generation module 70 verifies whether the position $u_c$, $v_c$ of the pixel resulting from the application of the transfer function to the pixel of the peripheral image corresponds to a pixel appearing in the acquired image.

If so, then the generation module 70 determines the position $u_c$, $v_c$ for the application of the transfer function to the pixel of the peripheral image, the result being valid.

Otherwise, the generation module 70 determines the incorrect result for applying the transfer function to the pixel of the peripheral image.

During a comparison sub-step 264, the generation module 70 applies the mixing rule according to the number of valid result(s) coming from the application of each transfer function to the pixel of the peripheral image.

If the application of each transfer function to the pixel of the peripheral image provides the position of a pixel in only one acquired image, i.e. only one valid result, then the content of said pixel of the peripheral image is equal to the content of the pixel of the corresponding only one acquired image, during a first assignment sub-step 266.

If the application of each transfer function to the peripheral image pixel provides pixels for a plurality of acquired images, i.e. a plurality of valid results, then the content of the peripheral image pixel is equal to the content of the acquired image pixel which is the most central in the respective acquired image thereof, during a second assignment sub-step 267.

Otherwise, the pixel content of the peripheral image is equal to the color predefined in the third assignment step 268. The predefined color is e.g. black.

The sub-steps of application 262, comparison 264 and, where appropriate, allocation 266, 267, 268 are iterated for each pixel of the peripheral image. Thus, a single scanning of the pixels of the peripheral image can be used for generating said peripheral image.

As an optional addition, during an addition step 280, the addition module 75 adds, in the generated peripheral image, the symbol representing the aircraft 10.

To this end, during a determination sub-step 282, the addition module 75 determines the size and the position of the symbol in the image generated from the position received from the peripheral point of view $O_v$.

To this end, the addition module 75 determines the size of the symbol, e.g. from the altitude H of the peripheral point of view $O_V$, the focal length $f_v$ associated with the peripheral point of view $O_V$ and a predefined dimension of the aircraft 10, in the way described hereinabove.

Furthermore, during the determination sub-step 282, the addition module 75 determines the position of the symbol in the generated peripheral image.

E.g., if during the reception step 220, the instruction of the first type is received from the human-machine interface 45, the addition module 75 determines the position of the symbol at the center of the generated peripheral image.

According to another example, if, during the reception step 220, the instruction of the second type is received from the human-machine interface 45, the addition module 75 determines the position of the symbol from the vector $\overrightarrow{O_{AV}O_V}$.

Then, the addition step 280 comprises an inclusion sub-step 284 during which the determined symbol is included in the peripheral image.

Also, as an optional supplement, the method 200 comprises a sending step 290 during which the sending module 80 sends the generated peripheral image to the display screen 40 for being displayed for the pilot of the aircraft 10.

It is clear that, if the generation method 200 does not include the optional addition step 280, during the sending step 290, the peripheral image sent to the display screen 40 is the peripheral image generated during the generation step 260.

It is also clear that, if the method 200 comprises the optional addition step 280, the peripheral image sent during the sending step 290 is the peripheral image generated during the step 260 to which the symbol representing the aircraft 10 is added.

The obtaining 230, acquisition 240, calculation 250, generation 260, and optionally addition 280 and sending 290 steps are reiterated at a plurality of successive instants, the plurality of peripheral images generated forming a video stream. E.g. said steps 230, 240, 250, 260, 280, 290 are iterated at a frequency e.g. equal to 20 Hz. A peripheral image is then formed every 0.05 s.

In a variant, the steps 230, 240, 250, 260, 280, 290 are iterated at a frequency between 50 Hz and 100 Hz. In other words, a peripheral image is generated every 0.01 s to 0.02 s.

The reception step 220 is iterated e.g. at a lower frequency. E.g., the reception step 220 is iterated at a frequency of 0.1 Hz. In other words, the position of the peripheral point of view $O_V$, and/or optionally the type of instruction and the focal length $f_V$ associated with the peripheral point of view $O_V$, is/are modified, and received, at most once every 10 seconds.

According to a first variant, during the obtaining step 230, the generation device 35 obtains only an instruction of the first type or only an instruction of the second type. Then, during the calculation step 250, the calculation module 65 performs only the aforementioned calculations corresponding to the type of instruction that the generation device 35 is configured for receiving. According to the first variant, the human-machine interface 45 is only configured for receiving, from the pilot, the instruction of the corresponding type.

According to a second variant, the calculation step 250 does not comprise the second calculation sub-step 254 nor the first determination sub-step 256. During the second determination sub-step 258, the calculation module 65 calculates each transfer function directly according to the following equations.

$$u_c = \frac{\left\langle \overrightarrow{d_V},\ f_c\left\langle \overrightarrow{(O_C O_V)_C},\ \vec{J}\right\rangle \widehat{R_V}^T \vec{K} + f_c H \widehat{R_V}^T \widehat{R_C} \vec{J}\right\rangle}{\left\langle \overrightarrow{d_V},\ \left\langle \overrightarrow{(O_C O_V)_C},\ \vec{I}\right\rangle \widehat{R_V}^T \vec{K} + H \widehat{R_V}^T \widehat{R_C} \vec{I}\right\rangle} \quad \text{[Math 17]}$$

and $$v_c = \frac{\left\langle \overrightarrow{d_V},\ f_c\left\langle \overrightarrow{(O_C O_V)_C},\ \vec{K}\right\rangle \widehat{R_V}^T \vec{K} + f_c H \widehat{R_V}^T \widehat{R_C} \vec{K}\right\rangle}{\left\langle \overrightarrow{d_V},\ \left\langle \overrightarrow{(O_C O_V)_C},\ \vec{I}\right\rangle \widehat{R_V}^T \vec{K} + H \widehat{R_V}^T \widehat{R_C} \vec{I}\right\rangle} \quad \text{[Math 18]}$$

According to the second variant, during the application sub-step 262 of the generation step 260, the generation module 70 calculates the common denominator DEN according to the following equation.

$$\mathrm{DEN} = \left\langle \vec{d}_V, \left\langle \overrightarrow{(O_C O_V)_C}, \vec{I}\right\rangle \widehat{R_V}^T \vec{K} + H \widehat{R_V}^T \widehat{R_C}\, \vec{I}\right\rangle \quad \text{[Math 19]}$$

The generation module 70 then applies equations (17) and (18) rather than equations (1) and (2).

The electronic generation device 35 and the associated generation method 200 can be thus used for a rapid generation of the peripheral image from a reduced number of sensors, the sensors comprising cameras 25 and preferentially a gyroscope 15 and an altimeter 20. Such sensors are less expensive than RADAR or LIDAR sensors.

The form of each transfer function calculated during the calculation step 250 makes it possible, during the generation step 260, to generate the peripheral image by scanning each pixel of the peripheral image only once. Thus, the generation of the peripheral image is accelerated making it possible to follow a so-called real-time rhythm. The expression "real-time" is herein understood in the sense of an image generated at most every 0.05 s, preferentially every 0.01 s to 0.02 s, and not requiring images acquired for instants prior to the instant at which the peripheral image is generated. In other words, each peripheral image is generated independently of the other peripheral images generated at earlier instants.

Furthermore, the clever factorization from which come the first $\vec{A}$, second $\vec{B}$ and third $\vec{C}$ quantities, makes it possible to calculate only once, for all the pixels of the peripheral image, said quantities $\vec{A}$, $\vec{B}$, $\vec{C}$. Indeed, the calculation of the quantities $\vec{A}$, $\vec{B}$, $\vec{C}$ is the most complex calculation of the generation method 200. Thereby, performing such calculations only once contributes to greatly accelerating the implementation of the generation method 200.

The instruction of the first type can be used for viewing the environment passing by around the aircraft 10. Such view is particularly advantageous during a take-off or a landing of the aircraft 10, in particular in rough areas for which the pilot's visibility is limited.

The instruction of the second type can be used for the surveillance of an area over which the aircraft 10 flies. Such surveillance is used for detecting different objects on the ground 36. Such surveillance is used in particular for detecting whether an object on the ground is moving with respect to the reference coordinate frame $R_{REF}$ since the peripheral image generated is fixed with respect to the reference coordinate frame $R_{REF}$.

The surveillance of the zone has a variety of applications such as spotting people lost in the mountains or at sea. Furthermore, zone surveillance is used for distinguishing whether an object on the surface of a sea overflown by the aircraft 10 is a fixed object such as a rock, or a mobile object such as a periscope of a submarine.

Furthermore, the optional addition step 280 enables the pilot to better understand the dimensions of the different objects visible on the peripheral image, compared with the images of the aircraft 10 the pilot is piloting.

In addition, the mixing rule improves the quality of the generated peripheral image since same is used, when the pixel of the peripheral image corresponds to a plurality pixels of the respective acquired images, for selecting the most central pixel in the respective image thereof and thus to do away, as much as possible, with distortion effect(s) on the edges of the acquired images.

Furthermore, the mixing rule makes it possible, when the pixel of the peripheral image does not correspond to any pixel of the acquired images, to not interrupt the generation of the peripheral image but only to notify the pilot about such absence of information by a pixel of the predefined color.

The invention claimed is:

1. A method for generating a peripheral image of an aircraft, the peripheral image comprised of a plurality of peripheral pixels obtained from a plurality of cameras equipping the aircraft, the method:

receiving a position of a point of view from which the peripheral image is to be generated;

obtaining an orientation of the aircraft;

acquiring an image from each camera of the plurality of cameras equipping the aircraft, each acquired image comprising a plurality of acquired pixels;

calculating, for each respective camera of the plurality of cameras, a transfer function that maps peripheral pixels of the plurality of peripheral pixels to acquired pixels of the plurality of acquired pixels, each transfer function for a camera of the plurality of cameras thus being associated with the image acquired by that same camera, each transfer function mapping each peripheral pixel of the plurality of peripheral pixels of the peripheral image to a possible corresponding acquired pixel of the plurality of acquired pixels of the acquired image; and generating the peripheral image from each of the acquired images and from each of the respective transfer functions, wherein each transfer function of each camera of the plurality of cameras is of the form:

$$u_c = \frac{a_u + b_u u_v + c_u v_v}{a' + b' u_v + c' v_v}$$

-continued $$v_c = \frac{a_v + b_v u_v + c_v v_v}{a' + b' u_v + c' v_v}$$

for each peripheral pixel of the plurality of peripheral pixels of the peripheral image, where $u_c$ is an abscissa position of an acquired pixel of the plurality of acquired pixels of the image acquired by the camera, relative to a coordinate frame associated with the camera, $v_c$ is an ordinate position of the acquired pixel of the plurality of acquired pixels of the image acquired by the camera, relative to the coordinate frame associated with the camera, $u_v$ is an abscissa position of the peripheral pixel of the plurality of peripheral pixels of the peripheral image, relative to a reference coordinate frame, $v_v$ is an ordinate position of the peripheral pixel of the plurality of peripheral pixels of the peripheral image, relative to the reference coordinate frame, and $a'$, $b'$, $c'$, $a_u$, $b_u$, $c_u$, $a_v$, $b_v$, $c_v$ are first to ninth coefficients, the first to ninth coefficients being specific to each camera of the plurality of cameras.

2. The method according to claim 1, wherein said obtaining comprises obtaining an orientation angle comprising at least one of a roll angle of the aircraft, a bearing angle of the aircraft, and a pitch angle of the aircraft.

3. The method according to claim 1, wherein each transfer function, when applied to a peripheral pixel of the plurality of peripheral pixels of the peripheral image, determines:

a position of an acquired pixel of the plurality of acquired pixels in the acquired image associated with the transfer function, if the peripheral pixel of the plurality of peripheral pixels of the peripheral image corresponds to an acquired pixel of the plurality of acquired pixels of the acquired image; or an incorrect result, otherwise.

4. The method according to claim 1, wherein said generating comprises determining a color of each peripheral pixel of the plurality of peripheral pixels of the peripheral image by applying, for each peripheral pixel, each transfer function to that peripheral pixel and a rule for mixing the acquired images for that peripheral pixel.

5. The method according to claim 4, wherein the rule for mixing the images for a given peripheral pixel of the plurality of peripheral pixels of the peripheral image is:

if applying each transfer function to the given peripheral pixel of the plurality of peripheral pixels of the peripheral image provides the position of an acquired pixel of the plurality of acquired pixels in a single acquired image, then the color of that peripheral pixel of the peripheral image is equal to the color of that acquired pixel of the plurality of acquired pixels of the single acquired image;

if applying each transfer function to the given peripheral pixel of the plurality of peripheral pixels of the peripheral image provides acquired pixels of the plurality of acquired pixels for a plurality of the acquired images, then the color of that peripheral pixel of the peripheral image is equal to the color of the acquired pixel of the plurality of acquired pixels of that acquired image for which the acquired pixel of the plurality of acquired pixels is most central therein; and otherwise, the color of the given peripheral pixel of the peripheral image is equal to a predefined color.

6. The method according to claim 1, further comprising sending the peripheral image to a display device, for being displayed to a pilot of the aircraft.

7. The method according to claim 1, further comprising adding a symbol representing the aircraft to the generated peripheral image, comprising:

determining a size and of a position of the symbol representing the aircraft, depending on the position of the point of view; and including, in the peripheral image, the symbol representing the aircraft.

8. The method according to claim 1, wherein said obtaining, said acquiring, said calculating and said generating are reiterated a plurality of times, the plurality of thus-generated peripheral images forming a video stream.

9. The method according to claim 1, wherein said calculating comprises determining the first to ninth coefficients for each transfer function using that, for any acquired pixel of the plurality of acquired pixels appearing in the respective acquired image mapped by the transfer function from a peripheral pixel of the plurality of peripheral pixels in the peripheral image, the vector linking an origin of the coordinate frame associated with the camera and the acquired pixel of the plurality of acquired pixels passes through the point with the following $$\begin{pmatrix} f_c \\ u_c \\ v_c \end{pmatrix}$$

in the coordinate frame associated with the camera, where:

$f_c$ is a focal length of the camera, and $u_c$ and $v_c$ are abscissa and ordinate positions of the acquired pixel of the plurality of acquired pixels.

10. The method according to claim 9, wherein the coordinate frame associated with each camera comprises a first camera axis, a second camera axis and a third camera axis, perpendicular to each other, and wherein said calculating a transfer function comprises, for each respective camera:

calculating a rotation matrix between the coordinate frame associated with the camera and the reference coordinate frame, from the orientation of the aircraft;

calculating, for any peripheral pixel of the plurality of peripheral pixels in the peripheral image:

a first quantity representative of a contribution, along the first camera axis, of the vector linking the origin of the coordinate frame associated with the camera and the corresponding acquired pixel of the plurality of acquired pixels, a second quantity representative of a contribution, along the second camera axis, of the vector linking the origin of the coordinate frame associated with the camera and the corresponding acquired pixel of the plurality of acquired pixels, and a third quantity representative of a contribution, along the third camera axis, of the vector linking the origin of the coordinate frame associated with the camera and the corresponding acquired pixel of the plurality of acquired pixels, each of the first, second, and third quantities depending on the calculated rotation matrix; and determining the first, second and third coefficients from the first quantity, the fourth, fifth and sixth coefficients from the second quantity, and the seventh, eighth and ninth coefficients from third quantity, respectively.

11. A non-transitory computer program product including software instructions which, when executed by a computer, cause the computer to implement a method according to claim 1.

12. An electronic device for generating a peripheral image of an aircraft, the peripheral image comprised of a plurality of peripheral pixels obtained from a plurality of cameras equipping the aircraft, the electronic device comprising:

a receiver receiving a position of a point of view from which the peripheral image is to be generated;

an obtainer obtaining an orientation of the aircraft;

an acquirer acquiring an image from each respective camera of the plurality of cameras equipping the aircraft, each acquired image comprising a plurality of acquired pixels;

a calculator calculating, for each camera of the plurality of cameras, a respective transfer function that maps peripheral pixels of the plurality of peripheral pixels to acquired pixels of the plurality of acquired pixels, each transfer function for a camera of the plurality of cameras thus being associated with the image acquired by that same camera, each transfer function mapping each peripheral pixel of the plurality of peripheral pixels of the peripheral image to a possible corresponding acquired pixel of the plurality of acquired pixels in the respective acquired image, wherein each transfer function of each camera of the plurality of cameras is of the form:

$$u_c = \frac{a_u + b_u u_v + c_u v_v}{a' + b' u_v + c' v_v}$$

$$v_c = \frac{a_v + b_v u_v + c_v v_v}{a' + b' u_v + c' v_v}$$

for each peripheral pixel of the plurality of peripheral pixels of the peripheral image, where $u_c$ is an abscissa position of an acquired pixel of the plurality of acquired pixels of the image acquired by the camera, relative to a coordinate frame associated with the camera, $v_c$ is an ordinate position of the acquired pixel of the plurality of acquired pixels of the image acquired by the camera, relative to the coordinate frame associated with the camera, $u_v$ is an abscissa position of the peripheral pixel of the plurality of peripheral pixels of the peripheral image, relative to a reference coordinate frame, $V_v$ is an ordinate position of the peripheral pixel of the plurality of peripheral pixels of the peripheral image, relative to the reference coordinate frame, and $a'$, $b'$, $c'$, $a_u$, $b_u$, $c_u$, $a_v$, $b_v$, $c_v$ are first to ninth coefficients, the first to ninth coefficients being specific to each camera of the plurality of cameras; and a generator generating the peripheral image from each acquired image and from each respective transfer function.

* * * * *